United States Patent [19]
Higuchi

[11] Patent Number: 5,917,713
[45] Date of Patent: Jun. 29, 1999

[54] RCC TYPE SWITCHING POWER SOURCE

[75] Inventor: Yoshio Higuchi, Osaka, Japan

[73] Assignee: Funai Electric Co. Ltd., Tokyo, Japan

[21] Appl. No.: 09/001,400

[22] Filed: Jan. 7, 1998

[30] Foreign Application Priority Data

Jan. 9, 1997 [JP] Japan .................................. 9-000045

[51] Int. Cl.$^6$ .............................................. H02M 3/335
[52] U.S. Cl. .............................................. 363/19; 363/95
[58] Field of Search .................... 363/16, 18, 19, 363/95, 97, 131; 323/902

[56] References Cited

U.S. PATENT DOCUMENTS

| | | | |
|---|---|---|---|
| 4,156,273 | 5/1979 | Sato | 363/56 |
| 4,858,099 | 8/1989 | McMillan et al. | 363/97 |
| 4,956,761 | 9/1990 | Higashi | 363/19 |
| 5,392,206 | 2/1995 | Peterson et al. | 363/19 |
| 5,668,704 | 9/1997 | Higuchi | 363/19 |

FOREIGN PATENT DOCUMENTS

| | | |
|---|---|---|
| 3-70468 | 3/1991 | Japan . |
| 4-344167 | 11/1992 | Japan . |

*Primary Examiner*—Adolf Deneke Berhane
*Attorney, Agent, or Firm*—Evenson, McKeown, Edwards & Lenahan, P.L.L.C.

[57] ABSTRACT

An RCC system switching power source comprises a delaying capacitor C1 having one terminal connected to the base of a switching transistor Q3 and the other terminal connected to a primary side ground level IN-. The delaying capacitor C1 delays the rise of the base voltage of the switching transistor Q3 after the current of a secondary coil 7 becomes zero.

7 Claims, 2 Drawing Sheets

RCC TYPE SWITCHING POWER SOURCE

BACKGROUND AND SUMMARY OF THE INVENTION

This invention relates to an RCC type switching power source in which the rise of the base voltage of a switching transistor is delayed by a delaying capacitor, and the switching frequency of the switching transistor is decreased to reduce the switching loss.

DESCRIPTION OF THE PRIOR ART

In devices such as video tape recorders and television sets, it is required to minimize the power consumption when they are in standby state. In other words, when such a device is in standby state, its load current is small; however, its switching power source must be such that the switching efficiency is maintained high.

In order to meet this requirement, the following technique has been proposed in the art: A pulse width to turn on a switching transistor is maintained unchanged independently of load power, while a pulse interval is changed according to the load. That is, when the load is small, the pulse interval is increased; and when the load is large, the pulse interval is decreased. Hence, as the load power decreases, the frequency of switching of the switching transistor is decreased, and accordingly the switching loss is also decreased. Therefore, when the load power decreases, the switching efficiency is not decreased.

However, in the above-described prior art, it is necessary to provide a circuit which generates a switching pulse having a predetermined pulse width.

In addition, it is necessary to provide a control circuit for varying the pulse interval. Hence, for a control circuit for controlling the operation of the switching transistor, it is essential to provided a comparison circuit and a latch circuit. Thus, the resultant equivalent circuit is quite complex.

Accordingly, an object of the invention is to eliminate the above-described difficulties.

More specifically, one object of the invention is to provide an RCC system switching power source which is self-exciting, and in which, after the output current of a secondary coil becomes zero, a delaying capacitor delays the rise of the base voltage of a switching transistor, thereby decreasing the switching frequency when the load power becomes smaller. Thus, even when the load power is less, the switching efficiency is maintained high.

Another object of the invention is to provide an RCC system switching power source in which connection and disconnection of the delaying condenser are freely performed, whereby the priority is given intermittently to maintaining switching efficiency.

Another object of the invention is to provide an RCC system switching power source having a simplified switching circuit for switching the connection and disconnection of the delaying capacitor.

Still another object of an invention is to provide an RCC system switching power source in which the connection and disconnection of the delaying capacitor are controlled by the output signal of a device which is a load of the power source.

Finally, yet another object of an invention is to provide an RCC system switching power source in which power consumption is decreased when a device which is a load of the power source is in standby state.

These and other objects and advantages are achieved by the RCC system switching power source according to the invention, in which a voltage produced in an auxiliary coil is rectified, and applied through a base resistor to the base of a switching transistor which controls a current in the primary coil. The RCC system switching power source according to the invention also includes a delaying capacitor having one terminal which is connected to the base of the switching transistor, and another terminal which is connected to a primary side ground level. After a current in the secondary coil decreases to zero, the delaying capacitor delays the rise of the base voltage of the switching transistor.

Accordingly, the switching transistor is maintained in an "off" state, even after the current of the secondary coil becomes zero. Therefore, a period occurs in which no current flows in the primary coil and the secondary coil, and in which resonance takes place with a frequency determined by the primary coil and an equivalent capacitance component connected to the primary coil. On the other hand, current flows through the base resistor of the switching transistor to the delaying capacitor. Hence, a voltage obtained by adding the resonance waveform to the voltage rise due to the charging of the delaying capacitor is applied to the base of the switching transistor. When this voltage exceeds a predetermined switching value, the switching transistor is abruptly turned on. Hence, the period during which the switching transistor is off, and the current of the secondary coil is zero (resonance period), is added to the switching period of the switching transistor, and the switching period is increased accordingly, so that the switching frequency is low.

In one embodiment of an RCC system switching power source according to the invention in addition to the above-described arrangement, a switching circuit controls the connection between the base of the switching transistor and the one terminal of the delaying capacitor, or between the other terminal and the primary side ground level is provided. Whenever the switching circuit is opened and no current flows in the secondary coil, the switching transistor is immediately placed in an "on" state. Accordingly, stabilization of the output voltage takes precedence over other priorities, such as maintaining switching efficiency. On the other hand, when the switching circuit is closed, the switching period is increased, and the switching efficiency of the control is high.

In another embodiment of the RCC system switching power source according to the invention, in addition to the above-described arrangement, the switching circuit is an NPN transistor whose collector is connector to the other terminal of the delaying capacitor and whose emitter is connected to the primary side ground level. The connection of the other terminal of the delaying capacitor and the primary side ground level is controlled by a signal applied to the base of the NPN transistor. That is, one transistor, and an element such as a resistor limit the base current form the switching circuit.

In yet another embodiment of the RCC system switching power source according to the invention, in addition to the above-described arrangement, a setting signal adapted to set on and off states of the NPN transistor is applied through a photo-coupler to the base. Thus, while the switching circuit belongs to the primary side circuit, the device outputting the setting signal is isolated from the primary side circuit by means of the photo-coupler. In this manner, an output signal of the device to which power is supplied from the secondary side (that is, the device which is a load of the power source) can be employed as the setting signal.

In a further embodiment of the RCC system switching power source according to the invention, in addition to the above-described arrangements, the setting signal indicates whether the device which is a load to the DC output is in a standby state or an operation state. When the signal indicates that the device is in a standby state, the NPN transistor is turned on effectively connecting the delay capacitor. Thus, in the standby state, the power consumption of the device which is a load of the power source is decreased. When, in this state, the NPN transistor is turned on, then the control is carried out in which the switching efficiency takes precedence over other priorities.

Other objects, advantages and novel features of the present invention will become apparent from the following detailed description of the invention when considered in conjunction with the accompanying drawings.

DETAILED DESCRIPTION OF THE DRAWINGS

Figure 1:
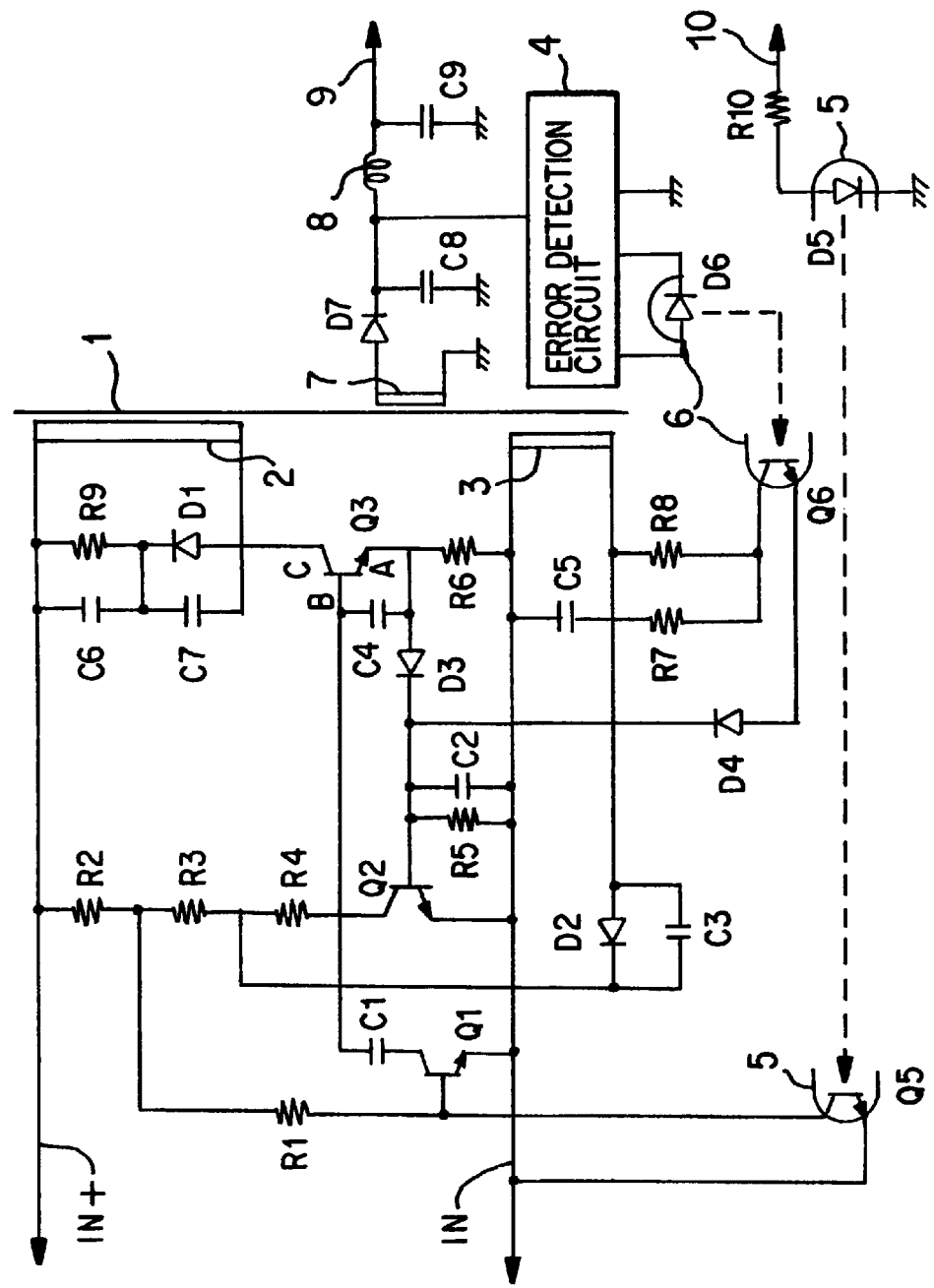
FIG. 1 is a circuit diagram showing the arrangement of an RCC system switching power source, which constitutes a preferred embodiment of the invention.

In FIG. 1, a DC current is applied to a plus input IN+ and a primary side ground level IN−. The DC current is obtained by rectifying and smoothing a commercial current which is introduced through a filter circuit adapted to prevent the leakage of switching noises.

A switching transistor Q3 switches a current flowing in the primary coil 2 of a transformer 1. Hence, one terminal of the primary coil 2 is connected to the plus input IN+, and the other terminal is connected to the collector of the switching transistor Q3. The emitter of transistor Q3 is connected to the primary side ground level IN− through a resistor R6 adapted to detect the emitter current as a voltage.

A resistor R2 whose one terminal is connected to the plus input IN+, and a resistor R3 whose one terminal is connected to the other terminal of the resistor R2 form a series circuit which supplies a start current to the switching transistor Q3. Hence, the other terminal of the resistor R3 is connected to the base of the switching transistor Q3 through a base resistor R4 which limits the base current. A small capacitor C4 is connected between the base and the emitter of the switching transistor, to prevent the occurrence of parasitic oscillation. The series circuit of the resistors R2 and R3 serves also as a voltage division circuit which is a voltage source to supply a base current to an NPN transistor Q1.

A circuit which comprises two capacitors C6 and C7, a resistor R9 and a diode D1, and is connected in parallel to the primary coil 2 absorbs the surge voltage which is generated in the primary coil 2 when the switching transistor Q3 is turned off.

A photo-coupler 6 feeds an error in output voltage (that is, a deviation from a desired value) back to the primary side. A transistor Q2 controls the base current of the switching transistor Q3 to stabilize the output voltage. Therefore, the base of the transistor Q2 is connected through a diode D4 to the emitter of photo-transistor Q6. The collector of the transistor Q2 is connected to the base of the switching transistor Q3.

The base of the transistor Q2 is connected to the primary side ground level IN− through a noise absorbing capacitor C2 and a discharging resistor R5. In order to limit the switching current flowing in the switching transistor Q3 when the power switch is turned on, a voltage detected by a resistor R6 is applied through a diode D3 to the base of the transistor Q2, and the emitter of transistor Q2 is connected to the primary side ground level IN−.

An auxiliary coil 3, one terminal of which is connected to the primary side ground level IN−, is provided to self-oscillate the switching transistor Q3. For this purpose, a second terminal of the auxiliary coil 3 is connected through a diode D2 to the connecting point of the resistor R3 and the base resistor R4. (A capacitor C3 connected in parallel to the diode D2 is a speed-up capacitor which is used when the switching transistor Q3 is turned off.) The second terminal of the auxiliary coil 3 is also connected through a resistor R8 to the collector of the photo-transistor Q6, which in turn is connected through a series circuit of a resistor R7 and a capacitor C5 to the primary side ground level IN−.

A delaying capacitor C1 is provided to delay the rise of the base voltage of the transistor Q3 after the flow of current in the secondary coil 7 is stopped. For this purpose, one terminal of the delaying capacitor C1 is connected to the base of the transistor Q3. The capacitance of the delaying capacitor C1 is set to a value which, with the resistors R2 through R4, corresponds to a time constant required for the delay.

The NPN transistor Q1 is a switch circuit which controls the connection of the delaying capacitor C1. Therefore, the other terminal of the delay capacitor C1 is connected to the collector of the NPN transistor Q1, the emitter of which is connected to the primary side ground level IN−. On the other hand, the base of the NPN transistor Q1 is connected through the resistor R1 to the connecting point of the resistors R2 and R3, which forms a voltage division circuit for supplying a base current to the NPN transistor Q1.

A voltage produced in the secondary coil 7 is rectified by a diode D7, and smoothed by a π type smoothing circuit comprising a coil 8 and capacitors C8 and C9. The output thus smoothed is applied, as a stabilized DC output 9 of +5V, to a microcomputer adapted to control the video cassette deck body.

The voltage rectified by the diode D7 is applied to an error detecting circuit 4 which essentially comprises a shut regulator. An error detected by the error detecting circuit 4 is supplied through the photo-diode D6 to the photo-transistor Q6 and applied to the transistor Q2.

A photo-coupler 5 applies a setting signal 10 outputted by the aforementioned microcomputer to the base of the NPN transistor Q1, for which the collector of the photo-transistor Q5 is connected to the base of the NPN transistor Q1, and the emitter of the photo-transistor Q5 is connected to the primary side ground level IN−. The setting signal 10 from the microcomputer is connected through a resistor R10 to the anode of the photo-diode D5, the cathode of which is grounded.

The transformer 1 has a plurality of secondary coils; however, FIG. 1 shows only the secondary coil 7 which is provided to obtain the stabilized DC output of +5V.

Figure 2:
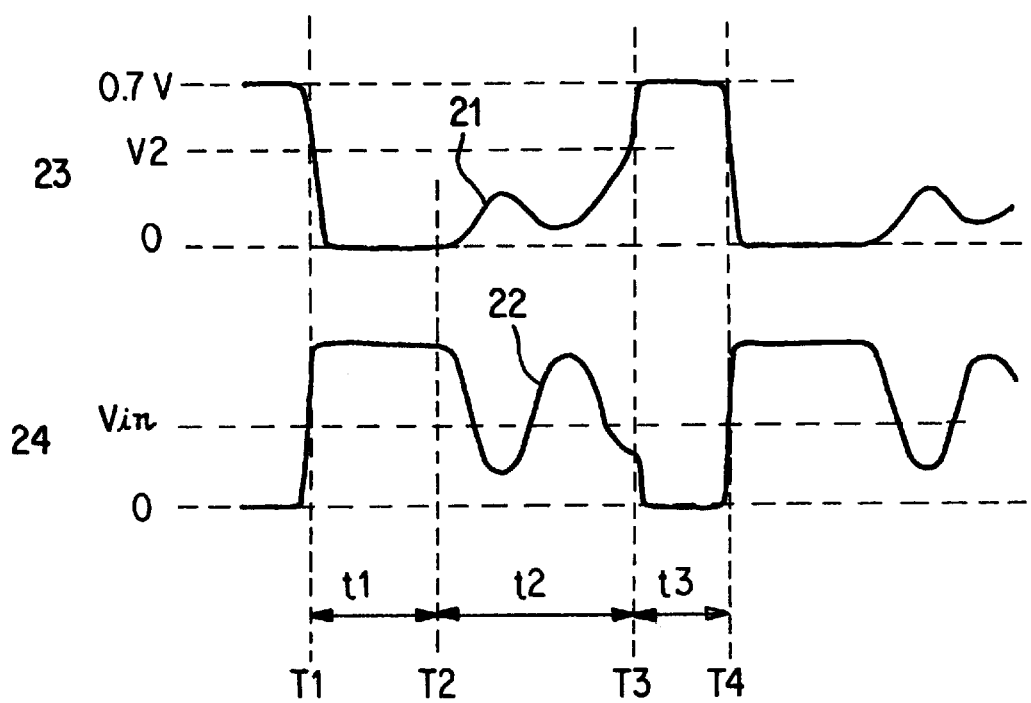
FIG. 2 is a timing chart showing the base voltage waveform of a switching transistor, and the collector voltage waveform of the same.

FIG. 2 is a time chart showing the signals of essential parts of the embodiment of FIG. 1. In FIG. 2, reference numeral 21 designates a voltage waveform of the base of the switching transistor Q3; and 22, a voltage waveform of the collector of the switching transistor Q3. The operation of the embodiment will be described with reference to FIG. 2, as necessary.

The microcomputer (not shown) outputs the setting signal 10, which is at "L" level when it is in a standby state. There are two kinds of standby states, namely, a first standby state and a second standby state. In both of the standby states, the setting signal 10 is at "L" level. In the first standby state, the operation of the video cassette deck is suspended, the display operation is stopped, and the operation of the power source keys of the operating panel and the remote controller are detected. That is, the external appearance is such that the power source is in an "off" state. In the second standby state, the operation of a mechanical section large in power consumption is stopped. That is, in the second standby state, the power consumption is smaller than in the first standby state. And the external appearance is such that the stop key is operated.

When the setting signal 10 is at the "H" level because the video cassette deck is in an operating state (such as a reproducing state), the photo-transistor Q5 is turned on, and the NPN transistor Q1 is turned off. Hence, the delaying capacitor C1 is effectively disconnected from the base of the switching transistor Q3. Accordingly, the operation of the switch circuit is equivalent to that of the prior art, and the switching of the switching transistor Q3 is controlled according to the error detected by the error detecting circuit 4. Therefore, the DC output 9 is stabilized at 5V.

On the other hand, when the setting signal 10 is set to "L" level because the video cassette deck is in the standby state, the photo-transistor Q5 is turned off, and the NPN transistor Q1 is turned on, so that the delaying capacitor C1 is connected between the base of the switching transistor Q3 and the primary side ground level N−.

In FIG. 2, if, at the time instant T1, the switching transistor Q3 is turned off, then after the time instant T1 current flows in the secondary coil 7, so that power corresponding to the power consumed during a unitary switching period is outputted to the secondary side. And when the period ti (during which the energy is discharged which has been stored in the transformer 1) is ended (that is, at time instant T2) the current in the secondary coil 7 is zero.

When the current in the secondary coil 7 is zero, owing to the reaction of energy discharge of the transformer 1 the auxiliary coil 3 generates a voltage to turn on the switching transistor Q3. However, since the delaying capacitor C1 is connected to the base of the switching transistor Q3, the voltage produced by the reaction of energy discharge of the transformer 1 is absorbed by the delaying capacitor C1. Therefore, the switching transistor Q3 is maintained off. That is, after the time instant T2, the switching transistor Q3 is off, while the current of the secondary coil 7 is zero.

After the time instant T2, capacitors C6 and C7 in the surge voltage absorbing circuit and the primary coil 2 set up parallel resonance. A voltage corresponding to the resonance is produced also in the auxiliary coil 3. Accordingly, a current based on the voltage produced in the auxiliary coil 3, and a current supplied through the resistors R2 and R3 flow in the base resistor R4.

Hence, the base voltage waveform of the switching transistor Q3 is a waveform which is obtained by superposing the resonance waveform on the voltage waveform which increases as the delaying capacitor C1 is charged (as indicated at 21 in FIG. 2). In this case, the collector voltage waveform of the switching transistor Q3 is an attenuation resonance (as indicated at 22 in FIG. 2) (the voltage Vin is the voltage which is applied between the plus input IN+ and the primary side ground level IN−).

On the other hand, the voltage produced in the auxiliary coil 3 is applied through the diode D2 and the base resistor R4 to the base of the switching transistor Q3. Hence, the switching transistor Q3 is maintained off with a voltage which is lower than a predetermined threshold base voltage V2. When the voltage exceeds the predetermined threshold base voltage, the switching transistor Q3 is abruptly turned off. Hence, during the period t2 the base voltage waveform of the switching transistor Q3 varies at a level which is lower than the voltage V2. When the time instant T3 occurs, and the base voltage exceeds the voltage V2, the switching transistor Q3 is abruptly turned on, and current flows in the primary coil 2. In the period t3 following the time instant T3, the collector current increases primarily. When the collector current reaches a predetermined value (at the time instant T4), the switching transistor Q3 is turned off.

This state is the same as the state at the time instant T1. Therefore, the above-described switching operation is repeatedly carried out, with a period which is the sum of the period t1 (in which the switching transistor Q3 is turned off and current flows in the secondary coil 7), the period t2 (in which the resonance occurs because the switching transistor Q3 is off, and the current in the secondary coil 7 is zero), and the period t3 (in which the switching transistor Q3 is turned on). Thus, when the delaying capacitor C1 is connected to the base of the switching transistor Q3, the switching period is increased by as much as the period t2 in which the resonance occurs; as a result, the switching frequency is decreased. Accordingly, the switching loss of the switching transistor Q3 is decreased. Therefore, when the setting signal 10 is set to the "L" level, the commercial power consumption is smaller than when the setting signal 10 is at "H". level.

In the RCC system switching power source according to the invention, a voltage produced in an auxiliary coil is rectified and applied through a base resistor to the base of a switching transistor adapted to switch the current in the primary coil. The RCC system switching power source according to the invention includes delaying capacitor having a first terminal which is connected to the base of the switching transistor, and a second terminal connected to a primary side ground level, so that, after the current in the secondary coil becomes zero, the rise of the base voltage of the switching transistor is delayed. Therefore, the resonance period during which the switching transistor is off and the current of the secondary coil is zero, is added to the switching period of the switching transistor. Hence, the switching frequency is lowered. Accordingly, even when the load power is low, degradation of the switching efficiency can be prevented.

According to another embodiment of the invention, in addition to the above-described arrangement, a switching circuit is provided to control the connection between the base of the switching transistor and the first terminal of the delaying capacitor, or between the second terminal and the primary side ground level. Therefore, when the switching circuit is opened, the control is as follows: when no current flows in the secondary coil, the switching transistor is immediately turned on, and stabilization of the output voltage takes precedence over other considerations (such as maintaining switching efficiency). When the switching circuit is closed, the switching period is increased, and the control is such that the switching efficiency is high.

In another embodiment of the invention, in addition to the above-described arrangement, the switching circuit is an NPN transistor whose collector is connector to the second terminal of the delaying capacitor and whose emitter is connected to the primary side ground level. The signal applied to the base of the NPN transistor controls the connection of the second terminal of the delaying capacitor and the primary side ground level. That is, one transistor and an element such as a resistor limiting the base current, form the switching circuit. Hence, the switching circuit which controls the connection of the delaying capacitor can be simplified.

In yet another embodiment of the invention, in addition to the above-described arrangement, a setting signal adapted to set on and off states of the NPN transistor is applied to the base through a photo-coupler, which isolates the device outputting the setting signal from the primary side circuit. In this manner, the connection of the delaying capacitor can be controlled by an output signal of the device which is a load of the power source.

In still a further embodiment of the invention, in addition to the above-described arrangements, the setting signal indicates whether a device which is a load to a DC output is in a standby state or in an operation state. When the signal indicates that the device is in the standby state, the NPN transistor is turned "on", and control is such that the switching efficiency takes precedence over other considerations (such as stabilization of the output voltage). Hence, when the device which is a load of the power source is in the standby state, the power consumption of the device which is a load of the power source is decreased.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An RCC system switching power source in which a voltage produced in an auxiliary coil is rectified and applied through a base resistor to a base of a switching transistor adapted to switch a current in a primary coil, wherein a delaying capacitor has a first terminal connected to the base of the switching transistor and a second terminal connected to a primary side ground level, whereby after a current in a secondary coil becomes zero, the rise of a base voltage applied to the switching transistor is delayed.

2. An RCC system switching power source as claimed in claim 1 wherein a switching circuit is connected to control a connection between the base of said switching transistor and the first terminal of the delaying capacitor, or between the second terminal of the delaying capacitor and the primary side ground level.

3. An RCC system switching power source as claimed in claim 2 wherein:

the switching circuit is an NPN transistor having a collector thereof connected to the second terminal of the delaying capacitor, and an emitter thereof connected to the primary side ground level; and a signal applied to the base of the NPN transistor controls the connection of the second terminal of the delaying capacitor and the primary side ground level.

4. An RCC system switching power source as claimed in claim 3 wherein a setting signal for setting on and off states of the NPN transistor is applied through a photo-coupler to a base of the NPN transistor.

5. An RCC system switching power source as claimed in claim 4 wherein:

the setting signal indicates whether a device which is a load to a DC output of the power source is in a standby state or in an operation state; and when the setting signal indicates that said device is in the standby state, said NPN transistor is turned on.

6. An RCC system switching power source comprising:

a first primary coil coupled to a current supply;

a switch element connected to control a flow of current through said primary coil, said switch element being turned on when a voltage applied to a control input of said switching device exceeds a predetermined threshold value;

a secondary coil inductively coupled to said primary coil, for generating an output voltage of said power source;

a feedback circuit connected to provide the control input of said first switch element with a voltage which exceeds the predetermined threshold voltage when a current in the secondary coil is zero; and a delaying capacitor intermittently coupled to the control input of the first switch element by means of a second switch element which is turned on upon receipt of a standby signal.

7. An electric power source comprising:

a transformer having at least a primary coil and an auxiliary coil on a primary side thereof, and a secondary coil on a secondary side thereof;

a switching transistor coupled to switch a current in the primary coil;

a rectifier coupled to rectify a voltage produced in the auxiliary coil and apply it to a base electrode of the switching transistor, via a base resistor; and a delaying capacitor having a first terminal connected to the base of the switching transistor and a second terminal connected to a primary side ground level, said delaying capacitor delaying a rise of a base voltage applied to the base of the switching transistor after a current in the secondary coil becomes zero.

* * * * *